(12) United States Patent  
Bae

(10) Patent No.: US 11,874,406 B1
(45) Date of Patent: Jan. 16, 2024

(54) ULTRASONIC SENSOR AND METHOD OF MANUFACTURING THE SAME

(71) Applicant: HYUNDAI MOBIS CO., LTD., Seoul (KR)

(72) Inventor: Sang Hee Bae, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/060,430

(22) Filed: Nov. 30, 2022

(30) Foreign Application Priority Data

Aug. 16, 2022 (KR) .................. 10-2022-0102151

(51) Int. Cl.
*G01S 7/521* (2006.01)
*G01S 15/08* (2006.01)

(52) U.S. Cl.
CPC .............. *G01S 7/521* (2013.01); *G01S 15/08* (2013.01)

(58) Field of Classification Search
CPC ................ G01S 7/521; G01S 7/52003; G01S 2007/52009; G01S 2007/52012; G01S 7/52004; G01S 15/88; G01S 15/42; G01S 15/10; G01S 5/26; G01S 15/87; G01S 15/96; G01S 15/02; G01S 7/524; G01S 7/526; G01S 15/06; G01S 15/04; G01S 7/523; G01S 7/536; G01S 7/497; G01S 7/52; G01S 7/52006; G01S 17/93; G01S 2015/936; G01S 2015/934; G01S 3/14;

(Continued)

(56) References Cited

U.S. PATENT DOCUMENTS 8,853,919 B2 10/2014 Lin
2013/0214642 A1 8/2013 Lin
(Continued)

FOREIGN PATENT DOCUMENTS

CN 103 674 088 3/2014
EP 2 879 128 6/2015
(Continued)

OTHER PUBLICATIONS

English Language Abstract of KR 2015-0001041 published Jan. 6, 2015.

(Continued)

*Primary Examiner* — Daniel L Murphy
*Assistant Examiner* — Amie M Ndure
(74) *Attorney, Agent, or Firm* — DLA PIPER LLP (US)

(57) ABSTRACT

An ultrasonic sensor includes a piezoelectric element, a cell case configured to support the piezoelectric element bonded to a front portion of the cell case at an inside of the cell case, the cell case having an opening at a rear portion thereof, a PCB assembly electrically connected to the piezoelectric element, a housing coupled to the opening of the cell case while receiving the PCB assembly therein and configured to seal a space required for electrical connection between the piezoelectric element in the cell case and the PCB assembly, a filler filling the space required for electrical connection between the piezoelectric element and the PCB assembly, after completion of the electrical connection between the piezoelectric element and the PCB assembly, and a rear cover configured to seal a rear opening formed at the housing in order to allow insertion of the PCB assembly.

20 Claims, 14 Drawing Sheets

(58) Field of Classification Search
CPC .......... G01S 7/292; G01S 15/08; G01S 15/74;
G01S 15/66; G01S 15/50; H04B 11/00;
H04B 13/02; H04B 7/0854; H04B
1/7163; H04B 2001/6912; H04B 3/46
USPC .......................................................... 367/118
See application file for complete search history.

(56) References Cited

U.S. PATENT DOCUMENTS

| | | | | |
|---|---|---|---|---|
| 2013/0242099 | A1* | 9/2013 | Sauer | B60R 1/00 |
| | | | | 348/148 |
| 2015/0222795 | A1* | 8/2015 | Sauer | B60R 11/04 |
| | | | | 348/148 |
| 2015/0266430 | A1* | 9/2015 | Mleczko | B60R 11/04 |
| | | | | 348/148 |
| 2015/0365569 | A1* | 12/2015 | Mai | G03B 17/55 |
| | | | | 348/373 |
| 2016/0349360 | A1 | 12/2016 | Ludwig | |
| 2017/0160386 | A1 | 6/2017 | Rostocki | |
| 2018/0098033 | A1* | 4/2018 | Mleczko | B60R 1/088 |
| 2018/0156901 | A1* | 6/2018 | Schmitt | G01S 15/87 |
| 2018/0255214 | A1* | 9/2018 | Biemer | H04N 23/54 |
| 2019/0273853 | A1* | 9/2019 | Sauer | H04N 23/51 |
| 2022/0014651 | A1* | 1/2022 | Sauer | H04N 23/55 |
| 2023/0239554 | A1* | 7/2023 | Sauer | B60R 1/12 |
| | | | | 348/148 |

FOREIGN PATENT DOCUMENTS

| | | |
|---|---|---|
| KR | 2015-0001041 | 1/2015 |
| KR | 2015-0004151 | 1/2015 |
| KR | 2016-0013683 | 2/2016 |

OTHER PUBLICATIONS

English Language Abstract of KR 2015-0004151 published Jan. 12, 2015.
English Language Abstract of KR 2016-0013683 published Feb. 5, 2016.
English Language Abstract of CN 103 674 088 published Mar. 26, 2014.
EP Search Report dated Aug. 14, 2023 issued in EP 22210767.4.

* cited by examiner

ULTRASONIC SENSOR AND METHOD OF MANUFACTURING THE SAME

CROSS-REFERENCE TO RELATED APPLICATION

This application claims the benefit of Korean Patent Application No. 10-2022-0102151, filed on Aug. 16, 2022 in the Korean Intellectual Property Office, the disclosure of which is incorporated herein by reference.

BACKGROUND OF THE INVENTION

Field of the Invention

The present invention relates to technology associated with an ultrasonic sensor.

Description of the Related Art

Ultrasonic sensors measure a position of and a distance to a target object, to be sensed, in a non-contact manner using an ultrasonic wave having a high frequency above an audible frequency range.

Since such an ultrasonic sensor is used in a vehicle or the like, the ultrasonic sensor should provide sufficient and stable waterproof performance. In addition, it is desirable that the ultrasonic sensor provide stable sensing performance while being inexpensively and simply manufactured.

The above matters disclosed in this section are merely for enhancement of understanding of the general background of the invention and should not be taken as an acknowledgement or any form of suggestion that the matters form the related art already known to a person skilled in the art.

SUMMARY OF THE INVENTION

Therefore, the present invention has been made in view of the above problems, and it is an object of the present invention to provide an ultrasonic sensor capable of providing stable sensing performance and waterproof performance while being inexpensively and simply manufactured, and a method of manufacturing the same.

It will be appreciated by persons skilled in the art to which the present invention pertains that technical problems to be solved by the present invention are not limited to the above-described technical problems, and other technical problems will be more clearly understood from the following description.

In accordance with an aspect of the present invention, the above and other objects can be accomplished by the provision of an ultrasonic sensor including a piezoelectric element, a cell case configured to support the piezoelectric element bonded to a front portion of the cell case at an inside of the cell case, the cell case having an opening at a rear portion thereof, a printed circuit board (PCB) assembly electrically connected to the piezoelectric element, a housing coupled to the opening of the cell case while receiving the PCB assembly therein and configured to seal a space required for electrical connection between the piezoelectric element in the cell case and the PCB assembly, a filler filling the space required for electrical connection between the piezoelectric element and the PCB assembly, after completion of the electrical connection between the piezoelectric element and the PCB assembly, and a rear cover configured to seal a rear opening formed at the housing in order to allow insertion of the PCB assembly.

The PCB assembly may be installed to divide an interior of the housing into a space connected to the cell case and a space connected to the rear cover such that the spaces are isolated from each other.

An application-specific integrated circuit (ASIC) may be disposed at a surface of the PCB assembly facing the cell case, and a circuit element having a greater volume protruding from the PCB assembly than a volume of the ASIC protruding from the PCB assembly may be disposed at a surface of the PCB assembly facing the rear cover.

The rear cover may be made of engineering plastic having a laser transmittance of 50% or more at a thickness of 1 mm. The rear cover may be bonded to the housing through laser welding.

A connector electrically connected to an exterior thereof may be formed at the housing such that the connector is integrated with the housing. Connector pins of the connector may be insert-molded in the housing such that one-side ends of the connector pins connected to the PCB assembly protrude toward the rear cover in parallel.

Lead pins may be inserted into the housing, for electrical interconnection between the PCB assembly and the piezoelectric element. The lead pins may be inserted into the housing such that one-side ends thereof connected to the PCB assembly protrude toward the rear cover in parallel to the connector pins. The PCB assembly may be coupled to the connector pins and the lead pins through press fitting.

The lead pins may be coupled to the housing through linear movement thereof in a forward/rearward direction from a side of the rear cover to a side of the cell case, so that movement of the lead pins relative to the housing in any direction may be restrained.

Each of the lead pins may include a restraint portion configured to be inserted into a pin insertion groove formed at the housing in front of the one-side end of the lead pin press-fitted in the PCB assembly, thereby restraining relative movement thereof in a direction perpendicular to the forward/rearward direction, and a press-fit protrusion protruding from the restraint portion in the forward/rearward direction, to be press-fitted in the housing.

The lead pin may be bent toward a central portion of the opening of the cell case after extending from the restraint portion in the forward/rearward direction. Restraint protrusions may be provided at the housing, to restrain opposite sides of a bent portion of the lead pin.

A wire may be provided between the other-side end of the lead pin and the piezoelectric element such that opposite ends of the wire are coupled to the lead pin and the piezoelectric element, respectively. The wire may have at least one bent portion at a middle portion thereof, to prevent the wire from being disconnected in spite of shrinkage and expansion of the filler.

The ultrasonic sensor may further include a rubber cap interposed between the cell case and the housing, and a front cover fitted around the cell case, to surround front portions of the rubber cap and the housing.

The housing may have an integrated structure including a support portion configured to support a rear end of the cell case under a condition that the rubber cap is interposed between the support portion and the rear end of the cell case and to allow the opening of the cell case to communicate with the interior of the housing, and a front end configured to protrude from an outside of the support portion in a forward direction while being surrounded by the front cover.

The rubber cap may have an integrated structure including a first sealing protrusion configured to press an inner peripheral surface of the support portion of the housing, thereby sealing the inner peripheral surface of the support portion, a second sealing protrusion configured to press an inner peripheral surface of the front end of the housing, thereby sealing the inner peripheral surface of the front end, and a third sealing protrusion configured to press an outer peripheral surface of the cell case, thereby sealing the outer peripheral surface of the cell case.

An enlarged portion enlarged in cross-section may be provided at a rear portion of the outer peripheral surface of the cell case. The third sealing protrusion may be formed to press a position where the enlarged portion of the cell case starts.

The front cover may be provided with a press-fit rib configured to be press-fitted at a front portion of the rubber cap. The rubber cap may be formed with a press-fit groove configured to receive the press-fit rib.

The front cover may be fused to the housing and the rubber cap by ultrasonic waves in a state in which the front cover presses the rubber cap against the outer peripheral surface of the cell case by an inclined surface formed inside the press-fit rib.

At least one protrusion rib may be formed at the support portion of the housing such that the protrusion rib protrudes toward the front portion of the rubber cap.

In accordance with another aspect of the present invention, there is provided a method of manufacturing an ultrasonic sensor, the method including bonding a piezoelectric element to a front portion of a cell case at an inside of the cell case, assembling the cell case to a front portion of a housing under a condition that a rubber cap is interposed between the cell case and the front portion of the housing, and fusing a front cover to the rubber cap and the front portion of the housing under a condition that the front cover surrounds the rubber cap and the front portion of the housing, coupling, to the housing, lead pins with wires welded thereto, welding the wires to the piezoelectric element, for interconnection therebetween, injecting a filler into an interior of the cell case and an interior of the housing where the wires are disposed, inserting a printed circuit board (PCB) assembly into the housing such that the lead pins and connector pins insert-molded in the housing are connected to the PCB assembly, and sealing a rear portion of the housing with the PCB assembly inserted therein by a rear cover.

The filler may be injected such that the filler fills only a space facing a front side of the PCB assembly. The PCB assembly may be inserted into the housing such that the lead pins and the connector pins are electrically interconnected through press fitting.

The rear cover may be made of engineering plastic having a laser transmittance of 50% or more at a thickness of 1 mm, and may be laser-welded to a rear portion of the housing injection-molded using a plastic resin, thereby sealing the housing.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
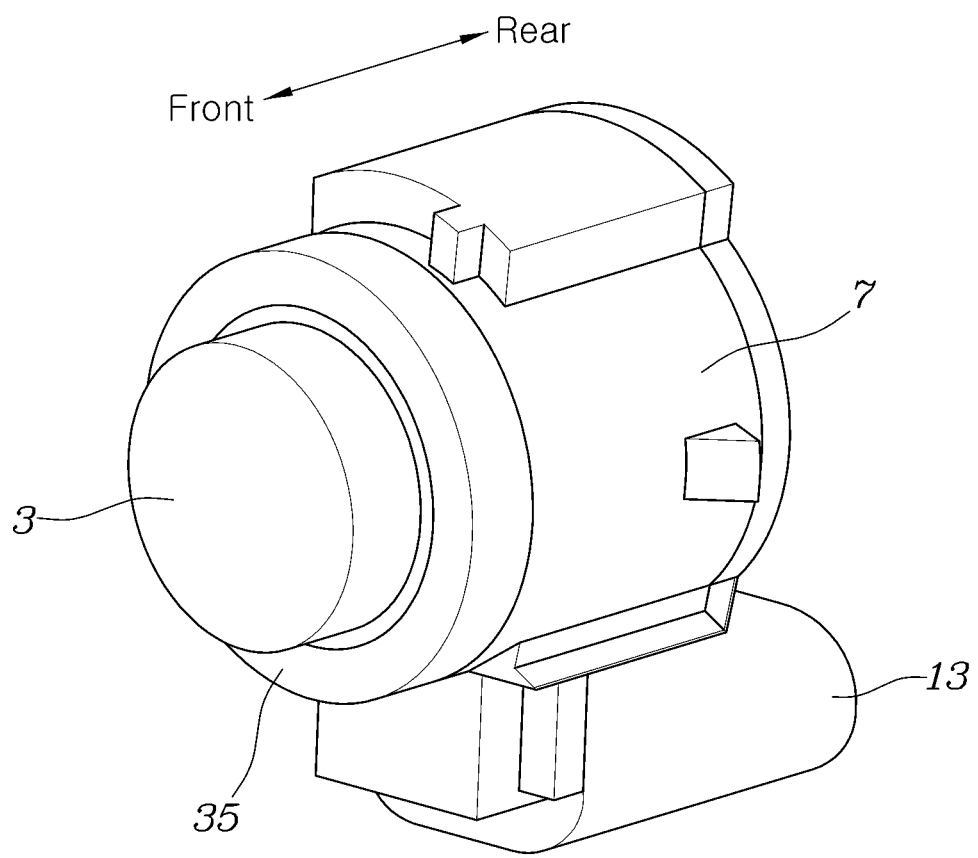
FIG. 1 is a perspective view showing an ultrasonic sensor according to an exemplary embodiment of the present invention.
Figure 2:
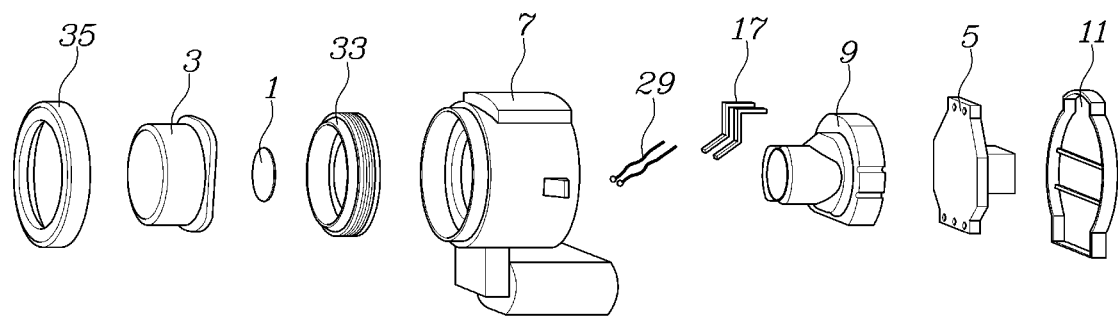
FIG. 2 is an exploded perspective view of the ultrasonic sensor of FIG. 1.
Figure 3:
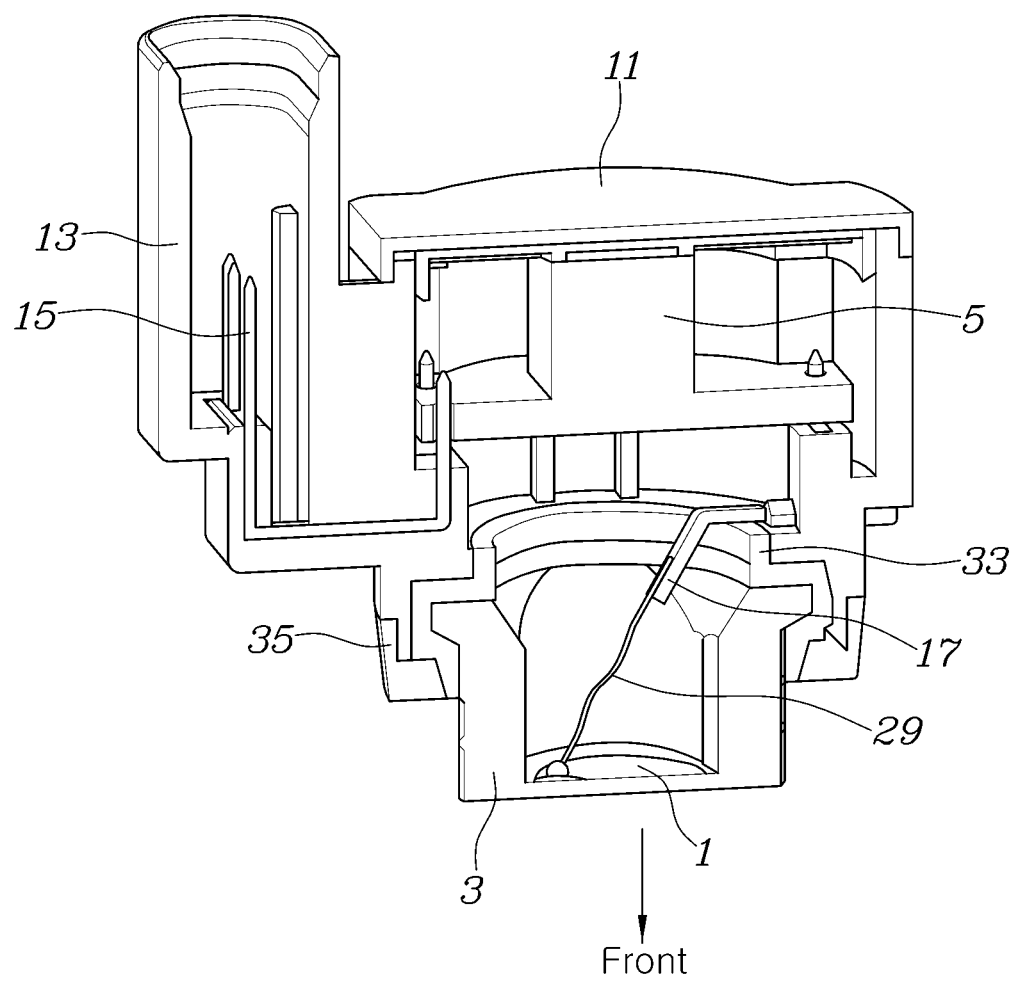
FIG. 3 is a view explaining an inner structure of the ultrasonic sensor of FIG. 1.
Figure 4:
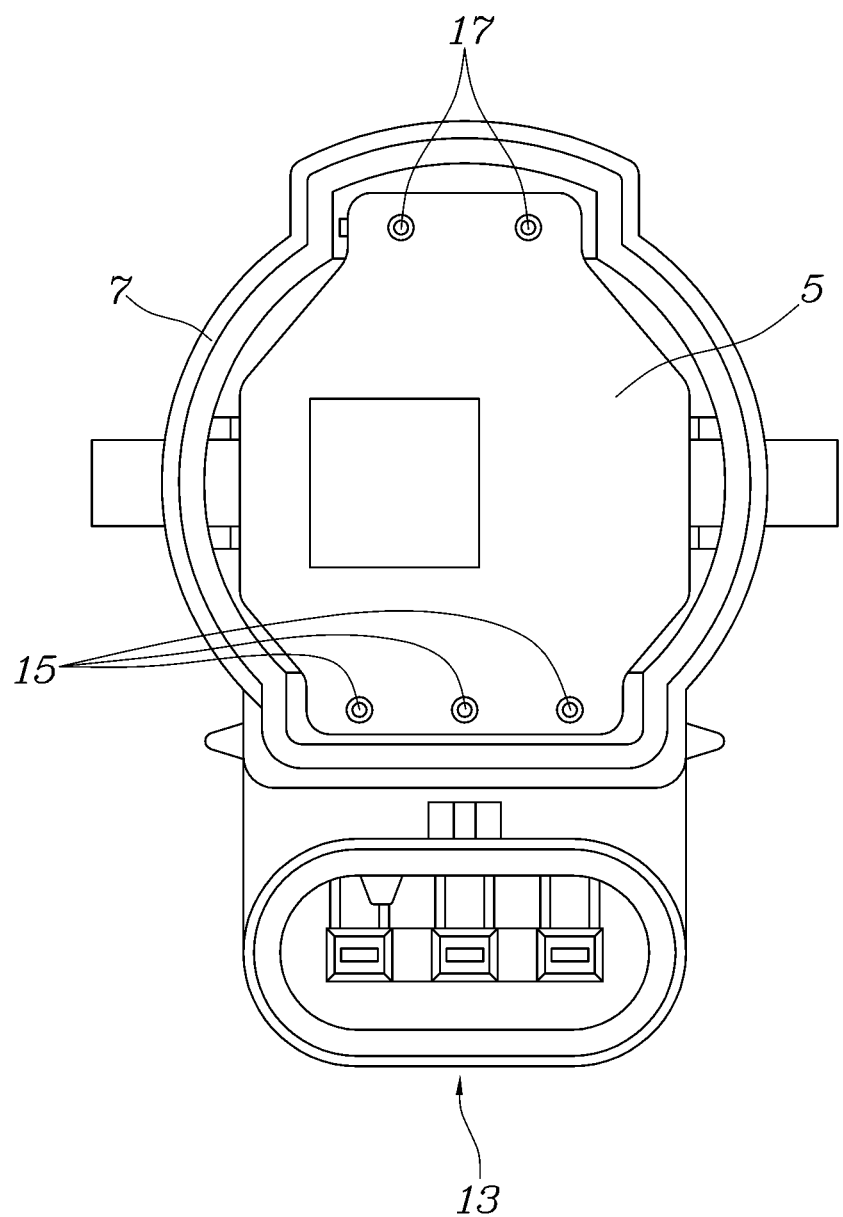
FIG. 4 is a view showing, at a rear side of the housing, a state in which a PCB assembly is inserted into a housing, in order to form an electrical connection state of the PCB assembly to connector pins and lead pins of the housing through press fitting.

Hereinafter, embodiments of the present invention will be described in detail with reference to the accompanying drawings, and the same or similar elements are designated by the same reference numerals regardless of the numerals in the drawings and redundant description thereof will be omitted.

The suffixes "module" and "unit" of elements herein are used for convenience of description and thus can be used interchangeably and do not have any distinguishable meanings or functions.

In the following description of the embodiments of the present invention, a detailed description of known functions and configurations incorporated herein will be omitted when it may obscure the subject matter of the embodiments of the present invention. In addition, the embodiments of the present invention will be more clearly understood from the accompanying drawings and should not be limited by the accompanying drawings, and it is to be appreciated that all changes, equivalents, and substitutes that do not depart from the spirit and technical scope of the present invention are encompassed in the present invention It will be understood that, although the terms "first," "second," etc. may be used herein to describe various elements, these elements should not be limited by these terms. These terms are only used to distinguish one element from another.

In the case where an element is "connected" or "linked" to another element, it should be understood that the element may be directly connected or linked to the other element, or another element may be present therebetween. Conversely, in the case where an element is "directly connected" or "directly linked" to another element, it should be understood that no other element is present therebetween.

Unless clearly used otherwise, singular expressions include a plural meaning.

In this specification, the term "comprising," "including," or the like, is intended to express the existence of the characteristic, the numeral, the step, the operation, the element, the part, or the combination thereof, and does not exclude another characteristic, numeral, step, operation, element, part, or any combination thereof, or any addition thereto.

In addition, the term "unit" or "control unit" used in specific terminology such as a motor control unit (MCU), a hybrid control unit (HCU), or the like is only a term widely used for designation of a controller for controlling a particular function of a vehicle and, as such, does not mean a generic functional unit.

The controller may include a communication device configured to communicate with another controller or a sensor, for control of a function to be performed thereby, a memory configured to store an operating system, logic commands, input/output information, etc., and at least one processor configured to execute discrimination, calculation, determination, etc. required for control of the function to be performed.

Referring to FIGS. 1 to 13, an ultrasonic sensor according to an exemplary embodiment of the present invention is shown. The ultrasonic sensor is configured through inclusion of a piezoelectric element 1, a cell case 3 configured to support the piezoelectric element 1 bonded to a front portion of the cell case 3 at an inside of the cell case 3, the cell case 3 having an opening at a rear portion thereof, a printed circuit board (PCB) assembly 5 electrically connected to the piezoelectric element 1, a housing 7 coupled to the opening of the cell case 3 while receiving the PCB assembly 5 therein and configured to seal a space required for electrical connection between the piezoelectric element 1 in the cell case 3 and the PCB assembly 5, a filler 9 filling the space required for electrical connection between the piezoelectric element 1 and the PCB assembly 5, after completion of the electrical connection between the piezoelectric element 1 and the PCB assembly 5, and a rear cover 11 configured to seal a rear opening formed at the housing 7 in order to allow insertion of the PCB assembly 5.

In addition, the PCB assembly 5 is installed to divide an interior of the housing 7 into a space connected to the cell case 3 and a space connected to the rear cover 11 such that the spaces are isolated from each other.

That is, in the ultrasonic sensor according to the exemplary embodiment of the present invention, the cell case 3, to which the piezoelectric element 1 is bonded, transmits and receives ultrasonic waves, and the housing 7 is divided into a front portion and a rear portion by the PCB assembly 5. The filler 9 fills an interior of the front portion of the housing 7 and, as such, the ultrasonic sensor is configured to minimize residual moisture therein during assembly thereof. In addition, the rear opening of the housing 7 for assembly of the PCB assembly 5, etc. is sealed by the rear cover 11 and, as such, the ultrasonic sensor may secure stable and reliable waterproof performance and sensing performance while securing aesthetics.

Preferably, an application-specific integrated circuit (ASIC) is disposed at a surface of the PCB assembly 5 facing the cell case 3, and a circuit element having a greater volume protruding from the PCB assembly 5 than that of the ASIC is disposed at a surface of the PCB assembly 5 facing the rear cover.

In detail, an empty space is formed between the PCB assembly 5 and the rear cover 11, and a circuit element having a relatively great volume (for example, a capacitor, an inductor, etc.) is disposed at a side of the PCB assembly 5 facing the rear cover 11, as described above, in order to minimize a volume of the space and, as such, to minimize moisture remaining in the sensor during assembly thereof.

Preferably, the rear cover 11 is made of engineering plastic having a laser transmittance of 50% or more at a thickness of 1 mm, and is bonded to the housing 7 through laser welding.

For example, for the rear cover 11, engineering plastic such as PBT/PET+GF30 or the like may be used. In this case, the rear cover 11 may be configured to have a thickness of about 1 mm such that the laser transmittance thereof is 50% or more and, as such, may be surely coupled to the housing 7 through laser welding.

When the rear cover 11, which is configured as described above, is coupled to the housing 7 through laser welding, sufficient welding strength may be secured and, as such, waterproof performance and durability of the ultrasonic sensor may be greatly enhanced.

A connector 13, which is electrically connected to an exterior thereof, is formed at the housing 7 such that the connector 13 is integrated with the housing 7. Connector pins 15 of the connector 13 are insert-molded in the housing 7 such that one-side ends of the connector pins 15 connected to the PCB assembly 5 protrude toward the rear cover 11 in parallel.

That is, as the connector 13 is formed at the housing 7, to be integrated with the housing 7, the connector 13 may be manufactured simultaneously with injection molding of the housing 7. Accordingly, it may be possible to not only achieve a reduction in cost, but also to prevent defects caused by moisture introduction, etc. occurring in an assembly structure of the housing 7 and the connector 13.

In addition, preferably, the connector 13 is formed as a waterproof connector, thereby achieving maximization of waterproofness.

Meanwhile, lead pins 17 are inserted into the housing 7, for electrical interconnection between the PCB assembly 5 and the piezoelectric element 1. The lead pins 17 are inserted into the housing 7 such that one-side ends thereof connected to the PCB assembly 5 protrude toward the rear cover 11 in parallel to the connector pins 15.

In a state in which the lead pins 17 are assembled to the housing 7, as described above, the PCB assembly 5 is coupled to the connector pins 15 and the lead pins 17 through press fitting.

Figure 5:
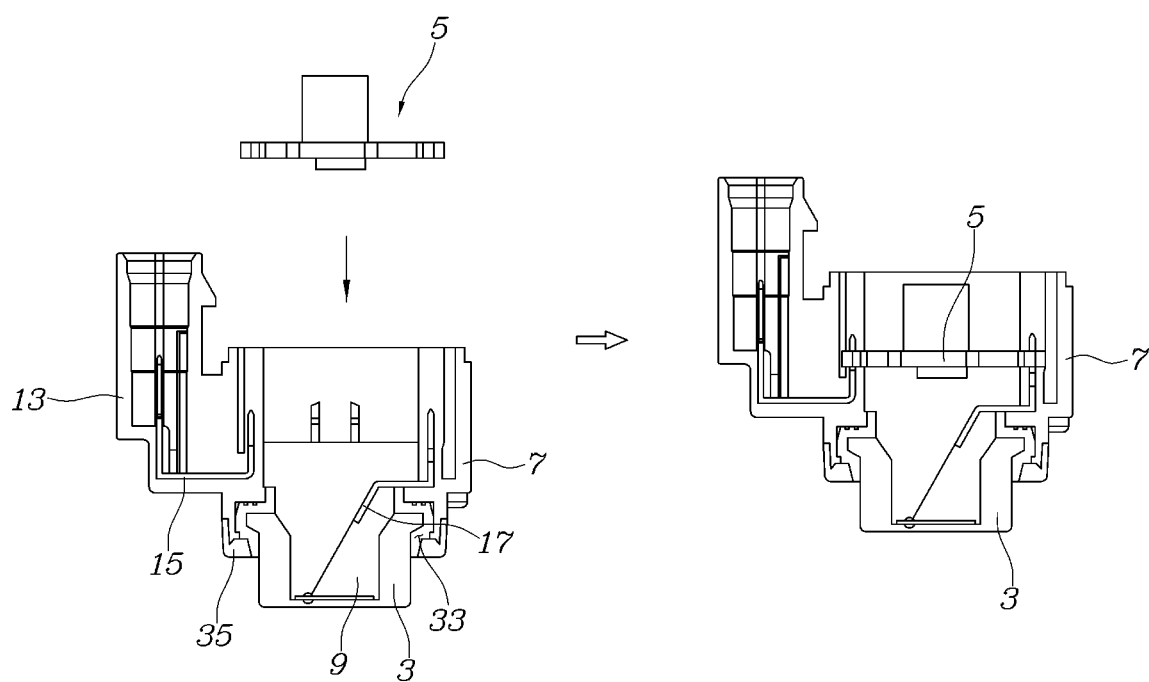
FIG. 5 is a view showing a procedure in which the PCB assembly is inserted into the housing, in order to form the electrical connection state of the PCB assembly to the connector pins and the lead pins of the housing through press fitting.

That is, as illustrated in FIG. 5, assembly of the PCB assembly 5 and the housing 7 is achieved simultaneously with electrical connection of the PCB assembly 5 to the connector pins 15 and the lead pins 17.

Accordingly, manufacturing processes may be remarkably reduced while preventing various quality problems caused by a soldering process.

The lead pins 17 are coupled to the housing 7 as the lead pins 17 linearly move in a forward/rearward direction from a side of the rear cover 11 to a side of the cell case 3. As such, movement of the lead pins 17 relative to the housing 7 in any direction is restrained.

That is, once the lead pins 17 are assembled to the housing 7 as the lead pins 17 are inserted into pin insertion grooves 19 in accordance with movement thereof in the forward/rearward direction, respectively, a stably fixed state of the lead pins 17 in which movement of the lead pins 17 relative to the housing 7 in any direction is restrained is secured.

Figure 6:
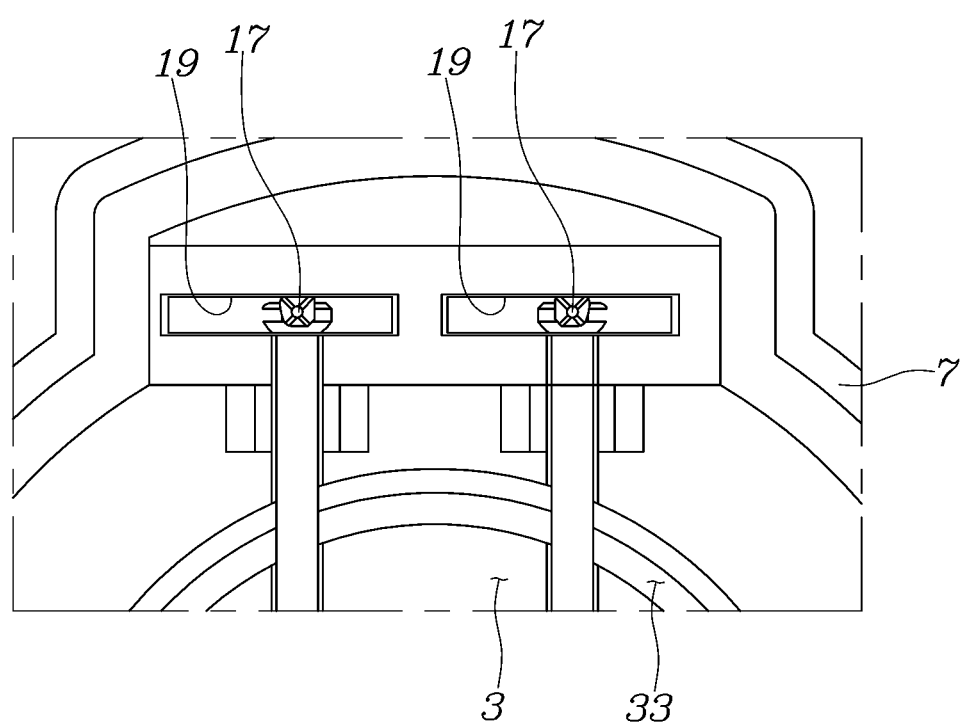
FIG. 6 is a view showing, at the rear side of the housing, a state in which the lead pins are assembled to the housing.
Figure 7:
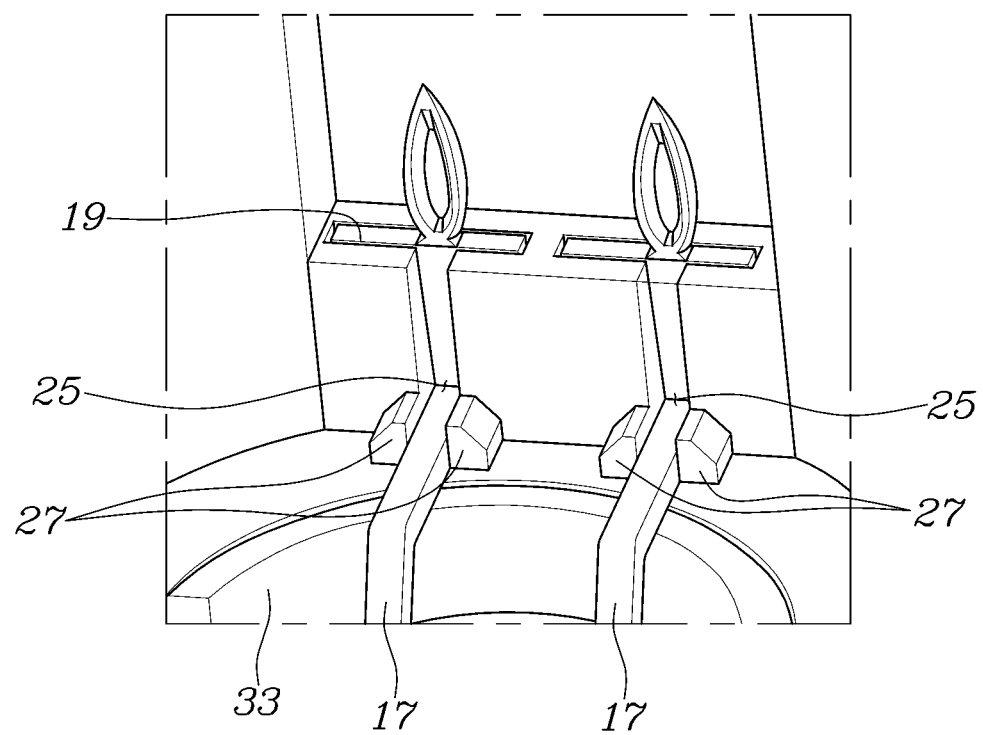
FIG. 7 is a perspective view showing the assembled state at an inside of the housing.
Figure 8:
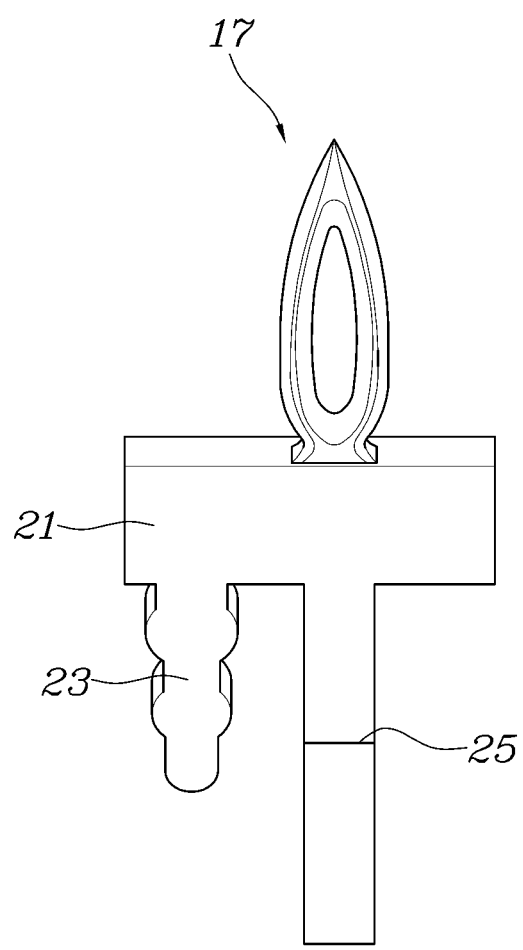
FIG. 8 is a view showing one of the lead pins of FIG. 6.

In detail, as shown in FIGS. 6 to 8, each of the lead pins 17 is configured through inclusion of a restraint portion 21 configured to be inserted into a corresponding one of the pin insertion grooves 19, which are formed at the housing 7 in front of one-side ends of the lead pins 17 press-fitted in the PCB assembly 5, in order to restrain relative movement thereof in a direction perpendicular to the forward/rearward direction, and a press-fit protrusion 23 protruding from the restraint portion 21 in the forward/rearward direction, to be press-fitted in the housing 7.

In addition, each lead pin 17 is bent toward a central portion of the opening of the cell case 3 after extending from the restraint portion 21 in the forward/rearward direction. Restraint protrusions 27 are provided at the housing 7, to restrain opposite sides of a bent portion 25 of each lead pin 17.

Accordingly, when the lead pin 17 is inserted into the pin insertion groove 19 of the housing 7 such that the press-fit protrusion 23 of the lead pin 17 is press-fitted in the housing 7, the press-fit protrusion 23, the restraint portion 21 and the bent portion 2 are restrained in a state in which relative movement thereof with respect to the housing 7 in any direction is impossible.

The stable and firm restraint state of the lead pin 17 as described above may prevent occurrence of problems of bending of pins, excessive press-fit pressure, etc. during coupling of the PCB assembly 5 through press fitting as described above.

A wire 29 is provided between the other-side end of each lead pin 17 and the piezoelectric element 1 such that opposite ends of the wire 29 are coupled to the lead pin 17 and the piezoelectric element 1, respectively. The wire 29 has at least one bent portion 31 at a middle portion thereof, in order to prevent the wire 29 from being disconnected in spite of shrinkage and expansion of the filler 9.

Figure 9:
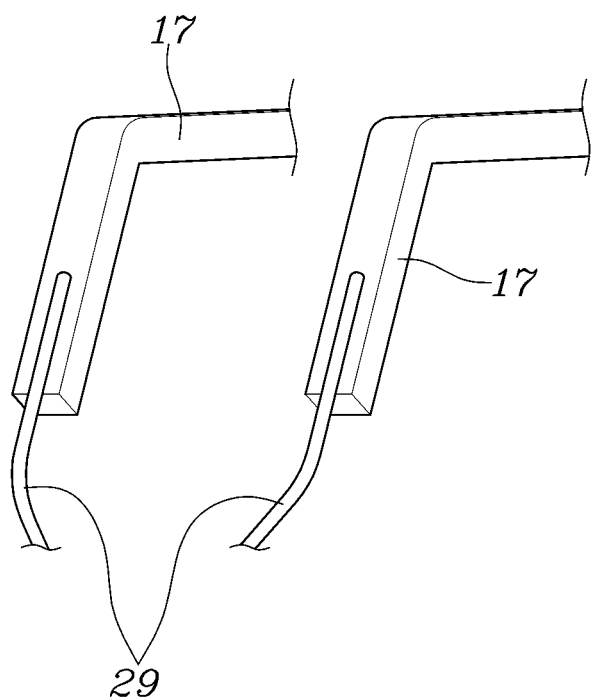
FIG. 9 is a view illustrating a state in which wires are welded to the lead pins, respectively.
Figure 10:
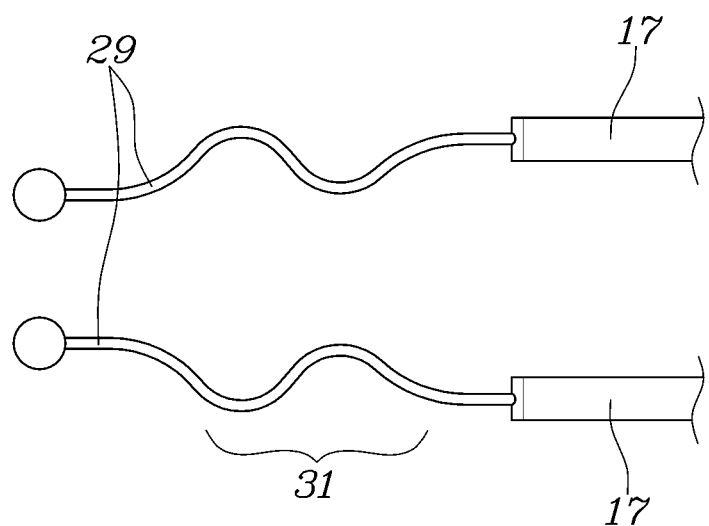
FIG. 10 is a view explaining bending of the wires welded to the lead pins.
Figure 11:
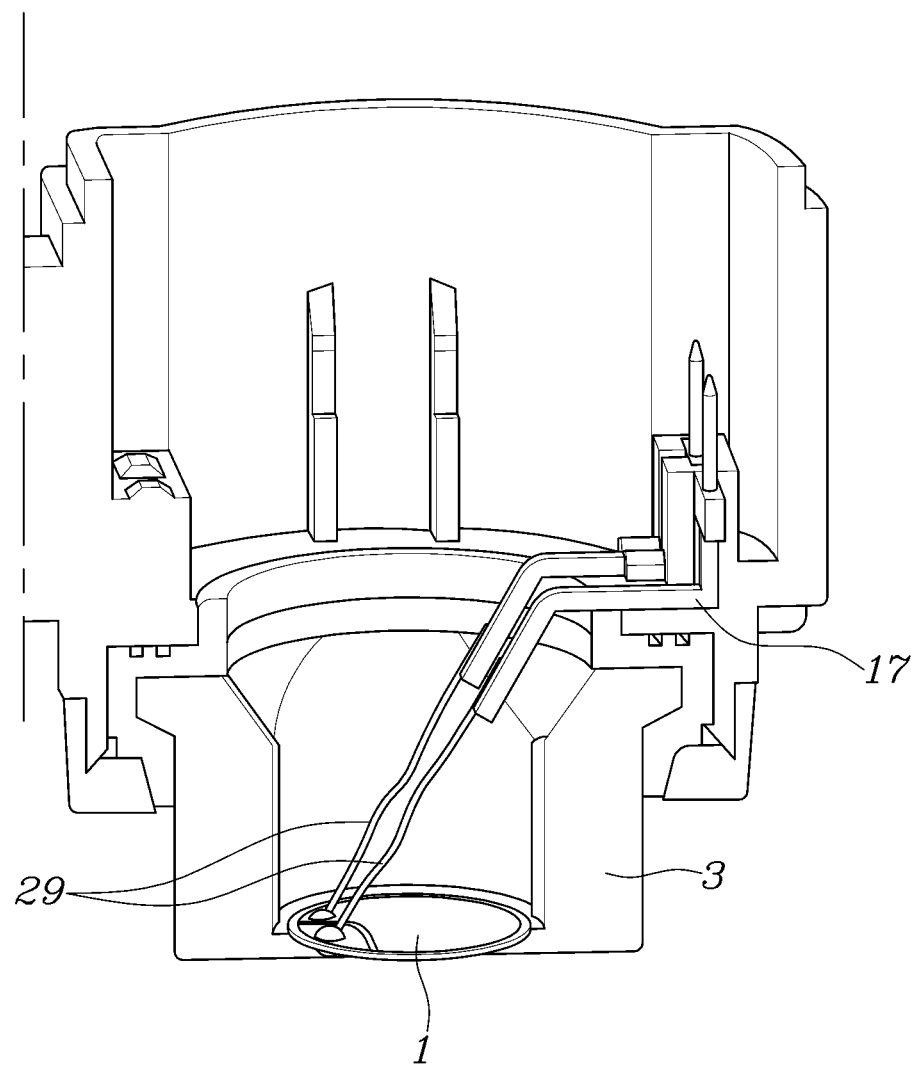
FIG. 11 is a view explaining a procedure in which the wires are laser-welded to a piezoelectric element.

That is, as shown in FIG. 9, the wire 29 is pressed on and then welded to the lead pin 17 such that bonding strength between the lead pin 17 and the wire 29 is enhanced. As the wire 29 has the at least one bent portion 31, as shown in FIG. 10, the bent portion 31 of the wire 29 receives deformation of the wire 29 caused by shrinkage and expansion of the filler 9 after filling of the filler 9, thereby preventing disconnection of the wire 29 itself and stably maintaining an interconnection state between the wire 29 and the piezoelectric element 1 and an interconnection state between the wire 29 and the lead pin 17.

Thus, stable durability of the ultrasonic sensor may be secured.

The ultrasonic sensor according to the exemplary embodiment of the present invention further includes a rubber cap 33 interposed between the cell case 3 and the housing 7, and a front cover 35 fitted around the cell case 3, to surround front portions of the rubber cap 33 and the housing 7.

The cell case 3 is made of a metal material such as aluminum or the like. Since the cell case 3 should perform a function for transmitting and receiving ultrasonic waves, together with the piezoelectric element 1 bonded thereto, a connection structure thereof to the housing 7 injection-molded using a plastic resin is essentially required. Accordingly, for coupling between the cell case 3 and the housing 7 in a state in which waterproof performance is secured, the rubber cap 33 and the front cover 35 are provided.

That is, the rubber cap 33 forms a basic watertight structure between the cell case 3 and the housing 7. In order to secure a stable mounting state of the rubber cap 33 as described above, the front cover 35 is coupled to the housing 7 while surrounding the rubber cap 33.

Figure 12:
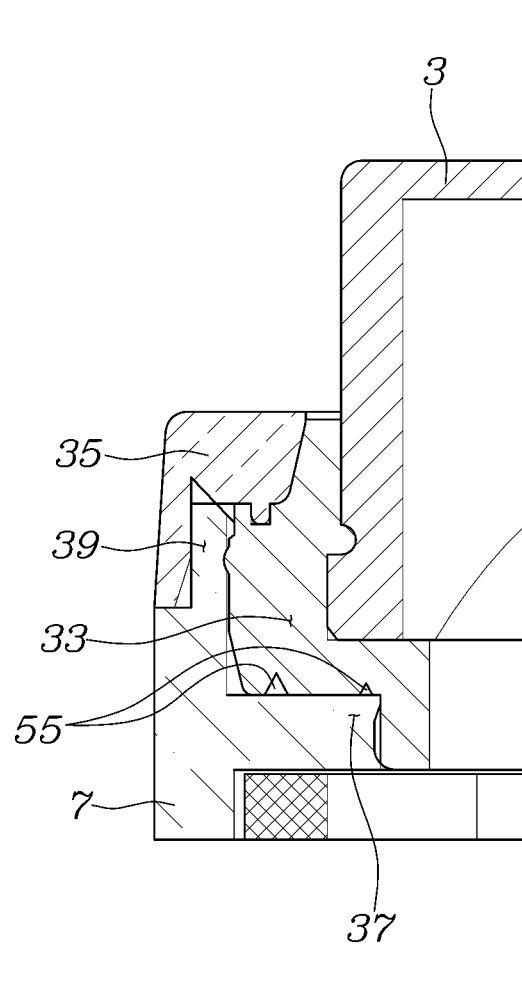
FIG. 12 is a cross-sectional view explaining formation of a watertight structure between a cell case and the housing by a rubber cap and a front cover.
Figure 13:
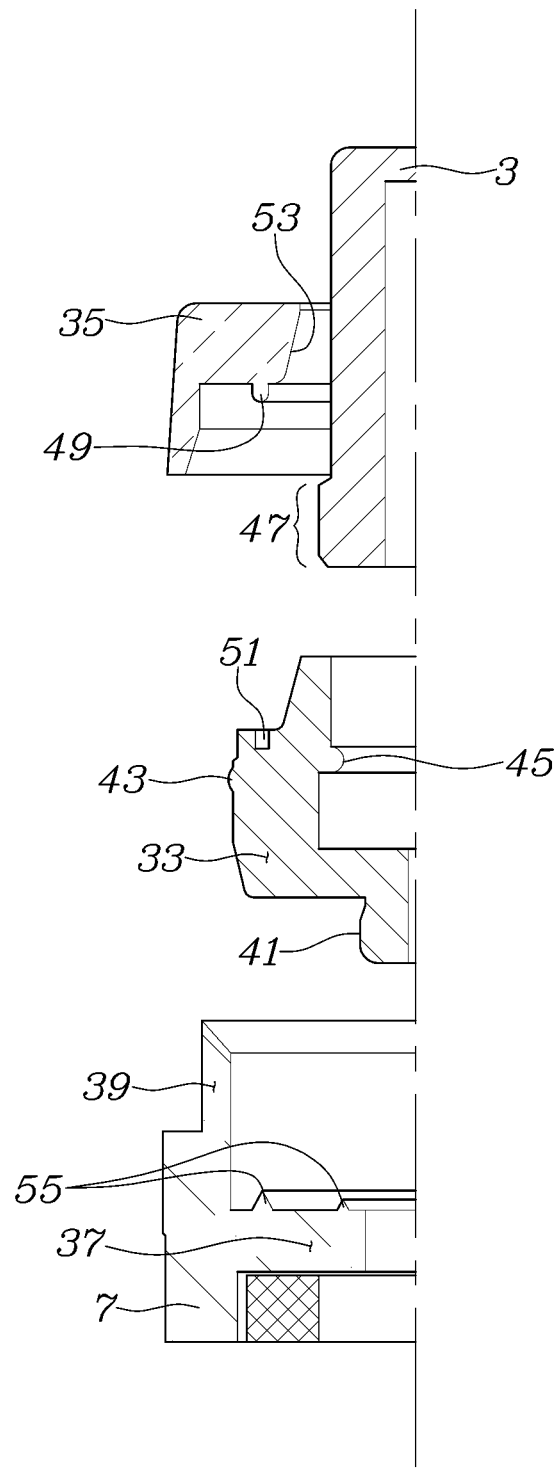
FIG. 13 is an exploded view showing constituent elements of FIG. 12 exploded in a forward/rearward direction.

Referring to FIGS. 12 and 13, the housing 7 has an integrated structure including a support portion 37 configured to support a rear end of the cell case 3 under the condition that the rubber cap 33 is interposed between the support portion 37 and the rear end of the cell case 3 and to allow the opening of the cell case 3 to communicate with an interior of the housing 7, and a front end 39 configured to protrude from an outside of the support portion 37 in a forward direction while being surrounded by the front cover 35.

In addition, the rubber cap 33 has an integrated structure including a first sealing protrusion 41 configured to press an inner peripheral surface of the support portion 37 of the housing 7, thereby sealing the inner peripheral surface of the support portion 37, a second sealing protrusion 43 configured to press an inner peripheral surface of the front end 39 of the housing 7, thereby sealing the inner peripheral surface of the front end 39, and a third sealing protrusion 45 configured to press an outer peripheral surface of the cell case 3, thereby sealing the outer peripheral surface of the cell case 3.

Accordingly, the third sealing protrusion 45 maximizes watertight performance between the outer peripheral surface of the cell case 3 and the rubber cap 33, and the second sealing protrusion 43 maximizes watertight performance between the housing 7 and the rubber cap 33.

In particular, an enlarged portion 47, which is enlarged in cross-section, is provided at a rear portion of the outer peripheral surface of the cell case 3. The third sealing protrusion 45 is formed to press a position where the enlarged portion 47 of the cell case 3 starts. Accordingly, it may be possible to maximize watertight performance by the third sealing protrusion 45 while minimizing application of pressure to a side wall of the cell case 3. Thus, sensing performance and waterproof performance of the ultrasonic sensor may be simultaneously enhanced.

Meanwhile, the first sealing protrusion 41 presses the inner peripheral surface of the support portion 37 of the housing 7, thereby preventing the filler 9 filling the interior of the cell case 3 inside the support portion 37 from penetrating into a gap between the rubber cap 33 and the housing 7.

Accordingly, generation of bubbles having a relatively great size in the filler 9 due to penetration of the filler 9 into the gap between the rubber cap 33 and the housing 7 may be prevented and, as such, generation of an abnormal waveform due to bubbles generated in the filler 9 as described above is prevented during sensing operation of the ultrasonic sensor.

For reference, for the filler 9, foamed silicon, etc. may be used. Bubbles generated due to foaming of the filler 9 itself have a remarkably smaller size than those of bubbles generated due to penetration of the filler 9 into the gap between the rubber cap 33 and the housing 7 and, as such, do not influence sensing performance of the ultrasonic sensor.

In addition, the front cover 35 is provided with a press-fit rib 49 configured to be press-fitted at a front portion of the rubber cap 33. The rubber cap 33 is formed with a press-fit groove 51 configured to receive the press-fit rib 49. Accordingly, the front cover 35 maintains the rubber cap 33 in a state in which the rubber cap 33 is more firmly and stably pressed against the housing 7 and the cell case 3.

That is, the front cover 35 is fused to the housing 7 and the rubber cap 33 by ultrasonic waves in a state in which the front cover 35 presses the rubber cap 33 against the outer peripheral surface of the cell case 3 by an inclined surface 53 formed inside the press-fit rib 49. Accordingly, a firm and stable watertight state may be secured.

In addition, at least one protrusion rib 55 is formed at the support portion 37 of the housing 7 such that the protrusion rib 55 protrudes toward a front portion of the rubber cap 33. By the protrusion rib 55, watertight performance between the rubber cap 33 and the housing 7 may be further enhanced.

Figure 14:
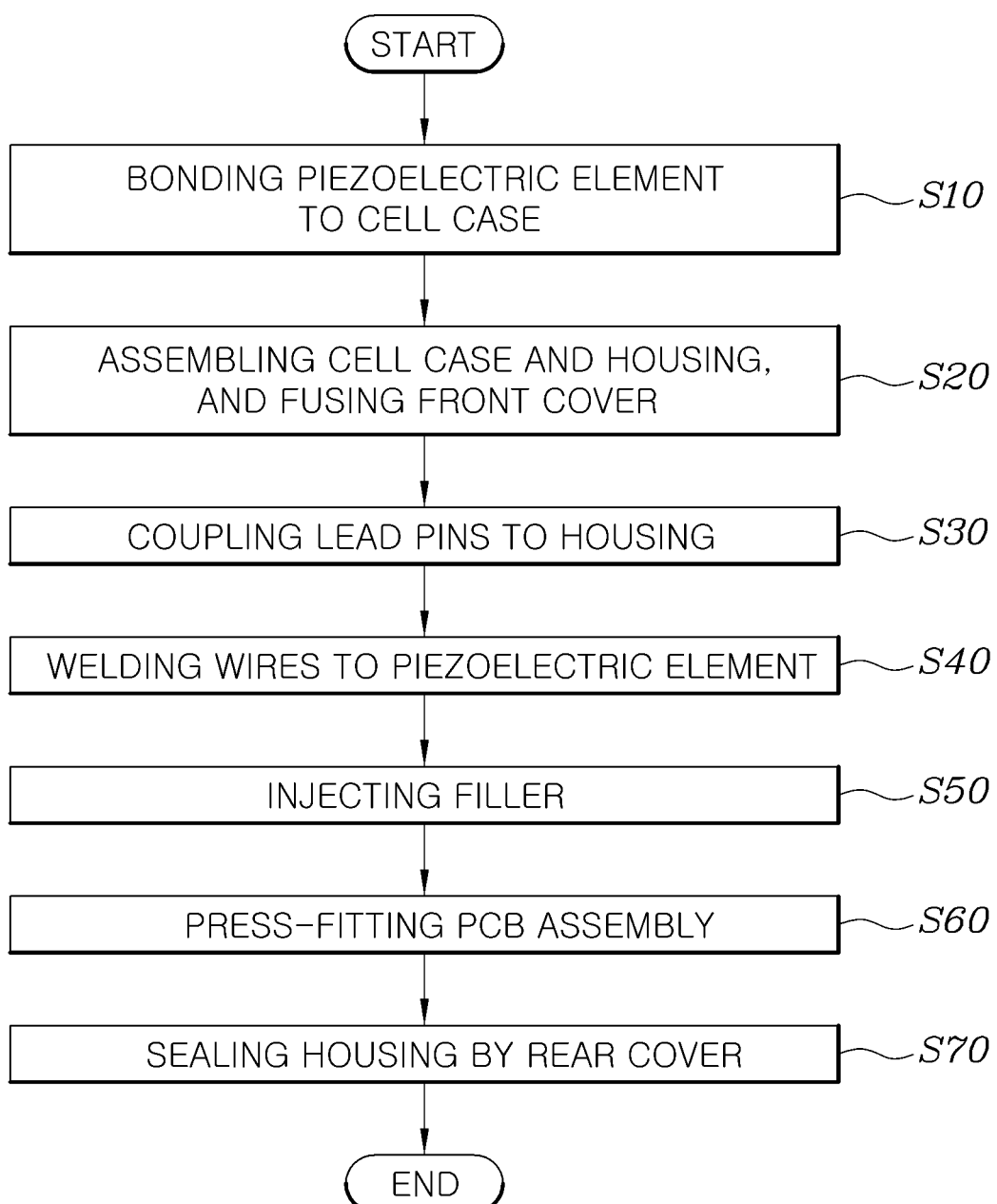
FIG. 14 is a flowchart showing a method of manufacturing an ultrasonic sensor in accordance with an exemplary embodiment of the present invention.

Referring to FIG. 14, a method of manufacturing an ultrasonic sensor in accordance with an exemplary embodiment of the present invention is shown. The method includes bonding a piezoelectric element 1 to a front portion of a cell case 3 at an inside of the cell case 3 (S10), assembling the cell case 3 to a front portion of a housing 7 under the condition that a rubber cap 33 is interposed between the cell case 3 and the front portion of the housing 7, and fusing a front cover 35 to the rubber cap 33 and the front portion of the housing 7 under the condition that the front cover 35 surrounds the rubber cap 33 and the front portion of the housing 7 (S20), coupling, to the housing 7, lead pins 17 with wires 29 welded thereto (S30), welding the wires 29 to the piezoelectric element 1, for interconnection therebetween (S40), injecting a filler 9 into an interior of the cell case and an interior of the housing 7 where the wires 29 are disposed (S50), inserting a printed circuit board (PCB) assembly 5 into the housing 7 such that the lead pins 17 and connector pins 15 insert-molded in the housing 7 are connected to the PCB assembly 5 (S60), and sealing a rear portion of the housing 7 with the PCB assembly 5 inserted therein by a rear cover 11 (S70).

When the wires 29 are welded to the piezoelectric element 1, this welding may be achieved by a laser irradiated through a rear opening of the housing 7.

The filler 9 is injected such that the filler 9 fills only a space facing a front side of the PCB assembly 5. The PCB assembly 5 is inserted into the housing 7 such that the lead pins 17 and the connector pins 15 are electrically interconnected through press fitting.

The rear cover 11 is made of engineering plastic having a laser transmittance of 50% or more at a thickness of 1 mm. The rear cover 11 is laser-welded to a rear portion of the housing 7 injection-molded using a plastic resin and, as such, seals the housing 7.

As apparent from the above description, the ultrasonic sensor according to the exemplary embodiment of the present invention may provide stable sensing performance and waterproof performance while being inexpensively and simply manufactured.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An ultrasonic sensor comprising:
   a piezoelectric element;
   a cell case configured to support the piezoelectric element bonded to a front portion of the cell case at an inside of the cell case, the cell case having an opening at a rear portion thereof;
   a printed circuit board (PCB) assembly electrically connected to the piezoelectric element;
   a housing coupled to the opening of the cell case and receiving the PCB assembly therein and configured to seal a space required for electrical connection between the piezoelectric element in the cell case and the PCB assembly;
   a filler filling the space required for electrical connection between the piezoelectric element and the PCB assembly; and
   a rear cover configured to seal a rear opening formed at the housing to allow insertion of the PCB assembly.

2. The ultrasonic sensor according to claim 1, wherein the PCB assembly divides an interior of the housing into a space connected to the cell case and a space connected to the rear cover such that the spaces are isolated from each other.

3. The ultrasonic sensor according to claim 2, wherein an application-specific integrated circuit (ASIC) is disposed at a surface of the PCB assembly facing the cell case, and a circuit element having a greater volume protruding from the PCB assembly than a volume of the ASIC protruding from the PCB assembly is disposed at a surface of the PCB assembly facing the rear cover.

4. The ultrasonic sensor according to claim 2, wherein:
   the rear cover is made of engineering plastic having a laser transmittance of 50% or more at a thickness of 1 mm; and
   the rear cover is bonded to the housing through laser welding.

5. The ultrasonic sensor according to claim 2, wherein:
   a connector is formed at the housing such that the connector is integrated with the housing; and
   connector pins of the connector are insert-molded in the housing such that one-side ends of the connector pins connected to the PCB assembly protrude toward the rear cover in parallel.

6. The ultrasonic sensor according to claim 5, wherein:
   lead pins are inserted into the housing, for electrical interconnection between the PCB assembly and the piezoelectric element;
   the lead pins are inserted into the housing such that one-side ends thereof connected to the PCB assembly protrude toward the rear cover in parallel to the connector pins; and
   the PCB assembly is coupled to the connector pins and the lead pins through press fitting.

7. The ultrasonic sensor according to claim 6, wherein the lead pins are coupled to the housing through linear movement thereof in a forward/rearward direction from a side of the rear cover to a side of the cell case, so that movement of the lead pins relative to the housing in any direction is restrained.

8. The ultrasonic sensor according to claim 7, wherein each of the lead pins comprises:
   a restraint portion configured to be inserted into a pin insertion groove formed at the housing in front of the one-side end of the lead pin press-fitted in the PCB assembly, restraining relative movement thereof in a direction perpendicular to the forward/rearward direction; and
   a press-fit protrusion protruding from the restraint portion in the forward/rearward direction, to be press-fitted in the housing.

9. The ultrasonic sensor according to claim 8, wherein:
   the lead pin is bent toward a central portion of the opening of the cell case after extending from the restraint portion in the forward/rearward direction; and
   restraint protrusions are provided at the housing, to restrain opposite sides of a bent portion of the lead pin.

10. The ultrasonic sensor according to claim 8, wherein:
   a wire is provided between an other-side end of the lead pin and the piezoelectric element such that opposite ends of the wire are coupled to the lead pin and the piezoelectric element, respectively; and the wire has at least one bent portion at a middle portion thereof, to prevent the wire from being disconnected in spite of shrinkage and expansion of the filler.

11. The ultrasonic sensor according to claim 2, further comprising:
   a rubber cap interposed between the cell case and the housing; and
   a front cover fitted around the cell case, to surround front portions of the rubber cap and the housing.

12. The ultrasonic sensor according to claim 11, wherein the housing has an integrated structure comprising:
   a support portion configured to support a rear end of the cell case under a condition that the rubber cap is interposed between the support portion and the rear end of the cell case and to allow the opening of the cell case to communicate with the interior of the housing; and
   a front end configured to protrude from an outside of the support portion in a forward direction while being surrounded by the front cover.

13. The ultrasonic sensor according to claim 12, wherein the rubber cap has an integrated structure comprising:
   a first sealing protrusion configured to press an inner peripheral surface of the support portion of the housing, sealing the inner peripheral surface of the support portion;
   a second sealing protrusion configured to press an inner peripheral surface of the front end of the housing, sealing the inner peripheral surface of the front end; and
   a third sealing protrusion configured to press an outer peripheral surface of the cell case, sealing the outer peripheral surface of the cell case.

14. The ultrasonic sensor according to claim 13, wherein:
   an enlarged portion having an enlarged cross-section is provided at a rear portion of the outer peripheral surface of the cell case; and
   the third sealing protrusion is formed to press a region where the enlarged portion of the cell case starts.

15. The ultrasonic sensor according to claim 13, wherein:
   the front cover is provided with a press-fit rib configured to be press-fitted at a front portion of the rubber cap; and
   the rubber cap is formed with a press-fit groove configured to receive the press-fit rib.

16. The ultrasonic sensor according to claim 15, wherein the front cover is fused to the housing and the rubber cap by ultrasonic waves in a state in which the front cover presses the rubber cap against the outer peripheral surface of the cell case by an inclined surface formed inside the press-fit rib.

17. The ultrasonic sensor according to claim 12, wherein at least one protrusion rib is formed at the support portion of the housing such that the protrusion rib protrudes toward the front portion of the rubber cap.

18. A method of manufacturing an ultrasonic sensor, the method comprising:
   bonding a piezoelectric element to a front portion of a cell case at an inside of the cell case;
   assembling the cell case to a front portion of a housing with a rubber cap interposed between the cell case and the front portion of the housing, and fusing a front cover to the rubber cap and the front portion of the housing such that the front cover surrounds the rubber cap and the front portion of the housing;
   coupling, to the housing, lead pins with wires welded thereto;
   welding the wires to the piezoelectric element;
   injecting a filler into an interior of the cell case and an interior of the housing where the wires are disposed;
   inserting a printed circuit board (PCB) assembly into the housing such that the lead pins and connector pins insert-molded in the housing are connected to the PCB assembly; and
   sealing a rear portion of the housing with the PCB assembly inserted therein by a rear cover.

19. The method according to claim 18, wherein:
   the filler is injected such that the filler fills only a space facing a front side of the PCB assembly; and
   the PCB assembly is inserted into the housing such that the lead pins and the connector pins are electrically interconnected through press fitting.

20. The method according to claim 18, wherein the rear cover is made of engineering plastic having a laser transmittance of 50% or more at a thickness of 1 mm, and is laser-welded to a rear portion of the housing injection-molded using a plastic resin, sealing the housing.

* * * * *